United States Patent [19]
Wiers

[11] 3,802,716
[45] Apr. 9, 1974

[54] VERSATILE TOWING VEHICLE HAVING AN ADJUSTABLE WHEEL BASE

[76] Inventor: Wayne L. Wiers, Rt. 1, Box 472, Plymouth, Ind. 46563

[22] Filed: Aug. 21, 1972

[21] Appl. No.: 282,243

[52] U.S. Cl. ............ 280/34 R, 280/5 H, 280/405 A, 280/415 B, 280/423 R
[51] Int. Cl. ............................................ B62d 21/00
[58] Field of Search ............ 296/26, 27, 99; 180/11, 180/12, 14; 280/34 R, 34 T, 80 B, 106, 405 R, 406 R, 407 R, 5 H, 405 A, 415 B, 423 R

[56] References Cited
UNITED STATES PATENTS
1,761,334   6/1930   Fry ................................... 280/106 R
1,621,555   3/1927   Miller ............................ 280/405 A
2,818,272   12/1957  Delay ............................ 280/80 B X
2,569,494   10/1951  Prior ................................ 280/5 H Primary Examiner—Stanley H. Tollberg
Assistant Examiner—Larry Martin
Attorney, Agent, or Firm—Oltsch & Knoblock

[57] ABSTRACT

A towing vehicle having an adjustable wheel base whereby the spacing between the front and rear wheel and axle assemblies of the vehicle can be varied. The rear vehicle wheel and axle assembly carries a fifth wheel coupler and either a ball or pintle hitch. The fuel tank assembly for the towing vehicle is divided into laterally spaced tank parts which are located under and at each side of the housing of the vehicle so as to accommodate the fore and aft shiftable movement of the rear wheel and axle assembly as the wheel base of the vehicle is varied.

2 Claims, 12 Drawing Figures

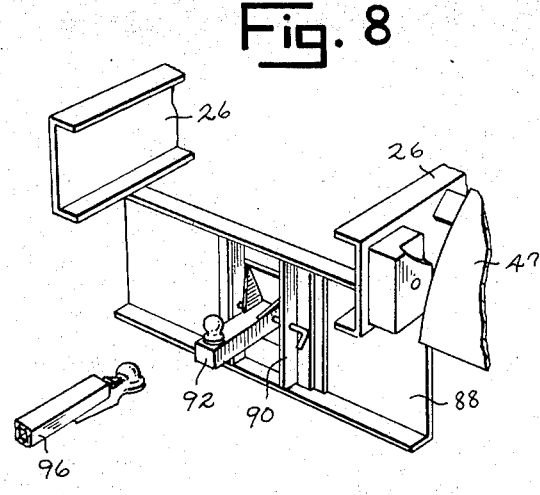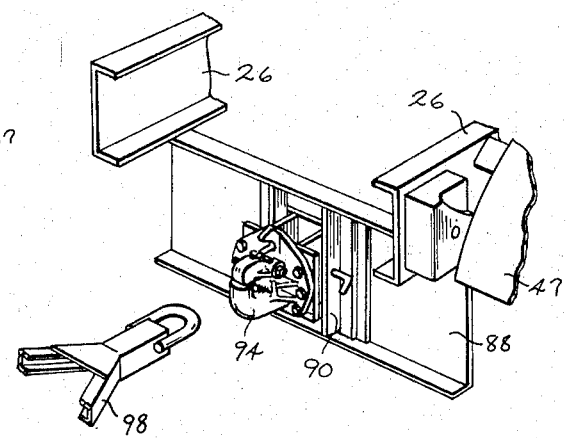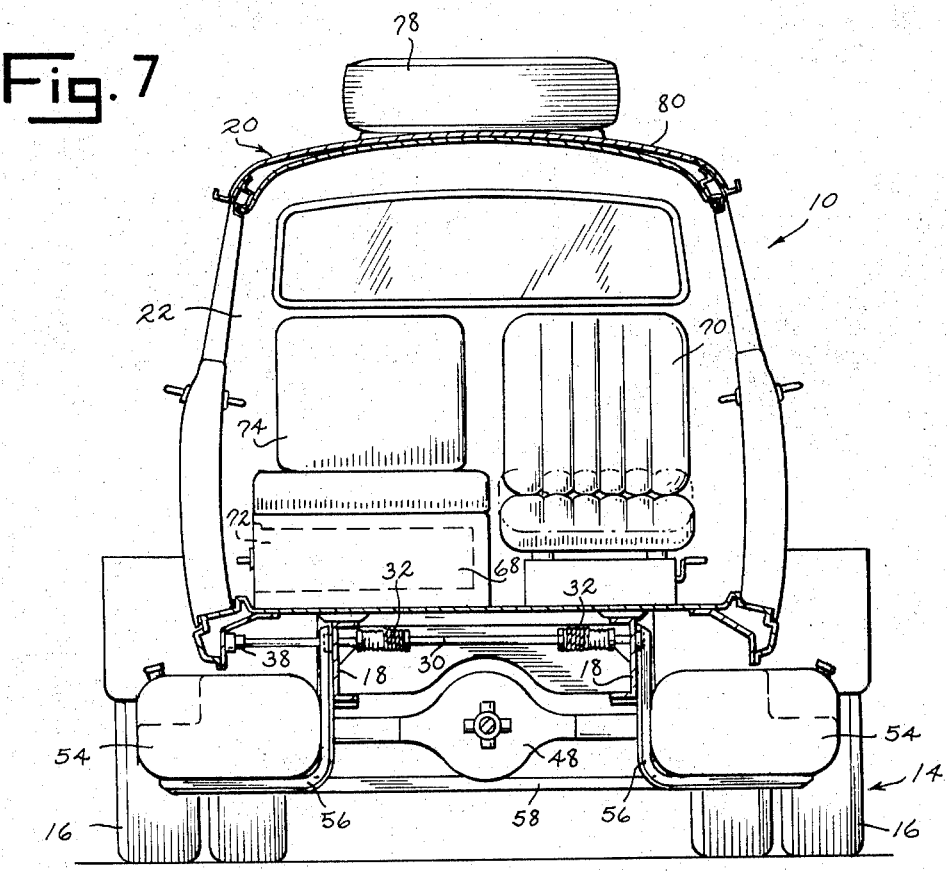

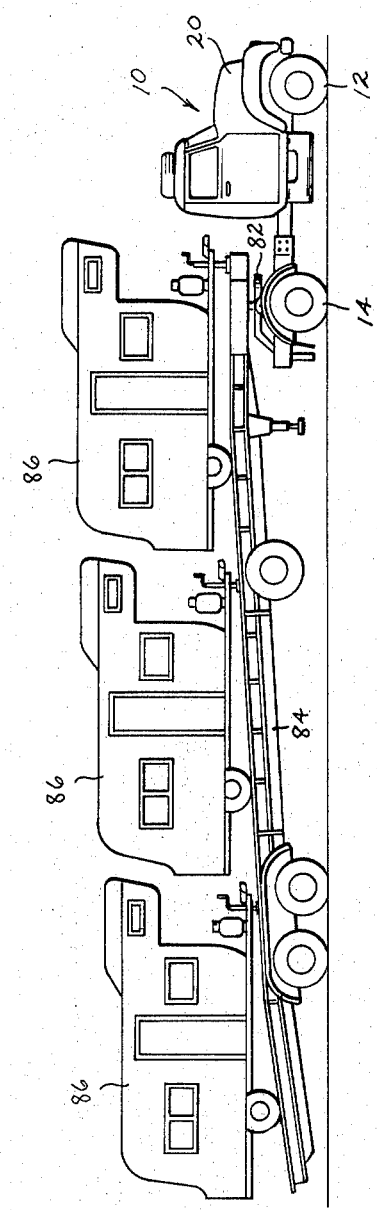
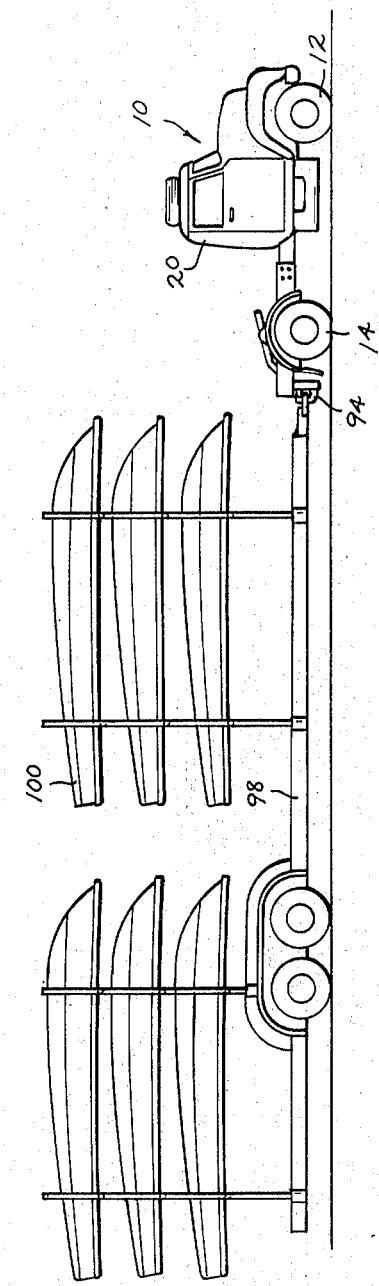

3,802,716

VERSATILE TOWING VEHICLE HAVING AN ADJUSTABLE WHEEL BASE

SUMMARY OF THE INVENTION

This invention relates to a towing vehicle and will have particular application to versatile tractor for having mobile homes, travel trailers, low-boy trailers, flat bed trailers, and semi trailers.

In this invention the towing vehicle includes front and rear wheel and axle assemblies. Housing means, which includes a driver's compartment, is carried by the front wheel and axle assembly. A motor means, which is connected to a fuel tank, is carried within the housing means and is connected to at least one of the front and rear wheel and axle assemblies for imparting driving motion to the vehicle. Frame means connect the front and rear wheel and axle assemblies for cooperative movement under the influence of the motor means. The frame means, which includes longitudinally shiftable parts, is adjustable so that the vehicle wheel base or spacing between the front and rear wheel and axle assemblies can be varied. The fuel tank assembly for the vehicle is carried under the housing means and includes spaced tank parts which are located on opposite sides of the housing means. The rear wheel and axle assembly is shiftable forwardly relative to the front wheel and axle assembly unitl it is positioned adjacent the housing means with the shiftable parts of the frame means being positioned between the spaced tank parts. A tool box for the vehicle may be located within the driver's compartment of the housing means. A spare tire for either the towing vehicle or the trailer which is connected to the towing vehicle may be carried on top of the housing means. The rear wheel and axle assembly carries a fifth wheel coupler as well as means for accommodating a ball hitch or a pintle hitch.

The versatility of the towing vehicle of this invention permits it to be used for the towing of mobile homes and recreational vehicles in which the over-all length of the towing vehicle and mobile home or recreational vehicle can be varied, depending upon the highway regulations of the particular state in which the vehicle is run. Additionally a low-boy or semi type trailer can be connected to the fifth wheel of the vehicle or, depending upon the type of construction of the trailer, to a pintle hook which is connected to the rear frame and axle assembly of the vehicle.

In the preferred construction of the towing vehicle of this invention, four types of brakes, air, vacuum, hydraulic and electric, can be provided so as to accommodate various types and kinds of towed loads.

Accordingly, it is an object of this invention to provide a towing vehicle having means for varying the spacing between the front and rear wheel and axle assemblies of the vehicle and for accommodating fifth wheel, ball hitch, and pintle hitch-coupled towed vehicle assemblies.

It is another object of this invention to provide a versatile towing vehicle which can be utilized to tow mobile homes, travel trailers, and low-boys into states having varying maximum vehicle length regulations.

Another object of this invention is to provide a truck tractor having means for varying the length of the wheel base of the tractor.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 3A is a detailed fragmentary view of that portion of FIG. 3 within broken circle 3A.

FIG. 7 is a sectional view taken along line 7—7 of FIG. 4.

FIG. 8 is a fragmentary perspective view of the coupler of the towing vehicle shown in the form of a ball hitch.

FIG. 9 is a perspective view of the coupler of the towing vehicle shown in the form of a pintle hitch.

FIG. 10 is a view of the towing vehicle shown attached to a low-boy trailer carrying a plurality of recreational vehicles.

FIG. 11 is a view of the towing vehicle shown attached to a flat-deck trailer carrying a plurality of boats.

DESCRIPTION OF THE PREFERRED EMBODIMENT

Figure 1:
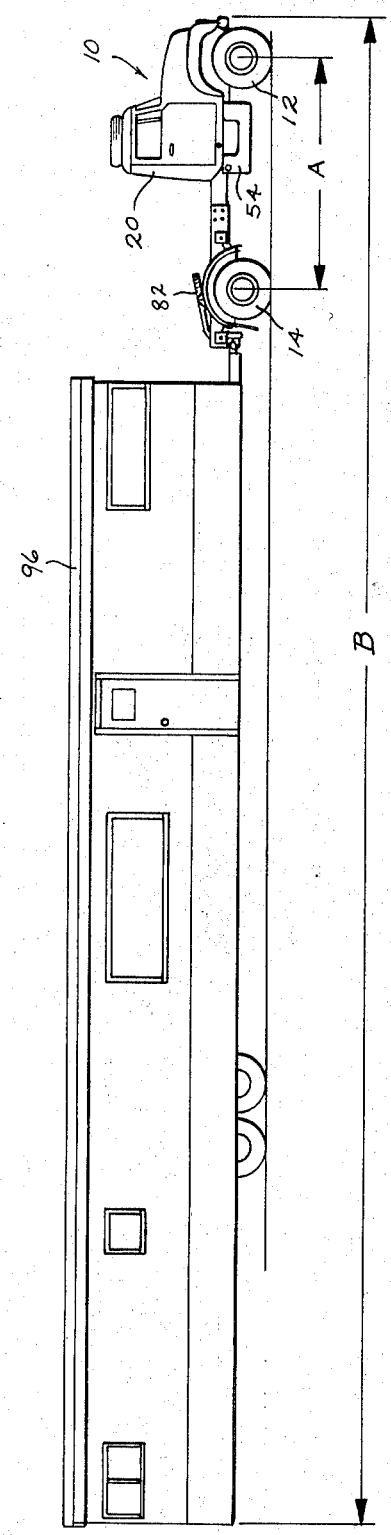
FIG. 1 is a perspective view of the towed vehicle shown connected to a mobile home with its front and rear wheel and axle assemblies spaced a selected maximum distance apart.

The preferred embodiment illustrated is not intended to be exhaustive or to limit the invention to the precise form disclosed. It is chosen and described in order to best explain the principles of the invention and its application and practical use to thereby enable others skilled in the art to best utilize the invention.

Towing vehicle 10 in the illustrated embodiment includes a front wheel and axle assembly 12 and a rear wheel and axle assembly 14. Each wheel and axle assembly 12 and 14 includes wheels 16 journaled upon a suitable axle. A frame assembly which includes laterally spaced longitudinally extending C-frame members 18 is carried by front wheel and axle assembly 12. A housing 20 is carried upon frame members 18 and includes a driver's compartment 22 and a forward compartment 24 which houses a motor (not shown).

Another frame assembly which includes laterally spaced longitudinally extending C-shaped frame members 26 is carried by rear wheel and axle assembly 14. Frame members 26 fit telescopically over frame members 18 connected to the front wheel and axle assembly 12 so that the rear wheel and axle assembly 14 can be shifted fore and aft relative to front wheel and axle assembly 12 between the extended position shown in FIGS. 1, 3 and 5 and the retracted position shown in FIGS. 2 and 6, thus varying the spacing between the wheel and axle assemblies and modifying the length of the wheel base of towing vehicle 10. Rotative bearing members 28, as best seen in FIG. 3A, are carried by frame members 18 and engage the inner surfaces of frame members 26 so as to facilitate shiftable telescopic movement of frame members 26 over frame members 18. A cable take-up shaft 30 extends transversely of and is journaled in frame members 18 under housing 20. A pair of cables 32 are connected to and coiled about shaft 30. A cable 32 extends along each frame member 18, having its ends secured to the forward end of the telescopically fitting frame member 26 and having an intermediate portion trained about a pulley 34 which is connected to the rear end of the frame member 18, as best shown in Fig. 3A. In some constructions of this invention, hydraulic means could be used to shift rear wheel and axle assembly 14 between its extended and retracted positions.

Figure 5:
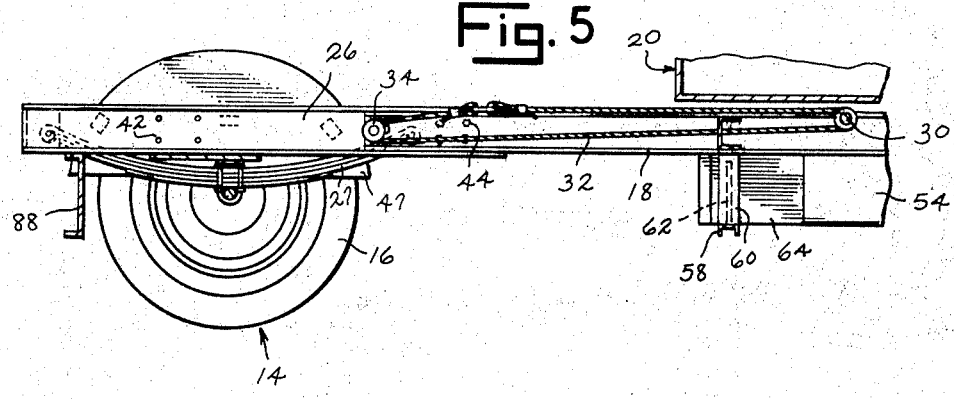
FIG. 5 is a fragmentary sectional view taken along line 5—5 of FIG. 4.
Figure 6:
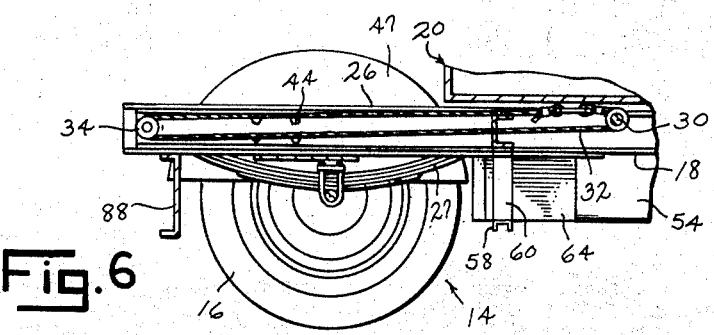
FIG. 6 is a fragmentary sectional view of the vehicle as shown in FIG. 5 but with the front and rear axle assemblies of the vehicle positioned a selected minimum distance apart.

An opening 36 is formed in housing 20 and is aligned with shaft 30. A coupler 38 is carried at one end of shaft 30 and is positioned adjacent to and aligned with opening 36 in the housing. A detachable crank handle 40 normally carried within housing 20 is insertable through opening 36 and engageable with coupler 38. Rotation of handle 40 when connected to coupler 38 as shown in FIG. 3 causes rotation of shaft 30 which in turn causes rotative movement of cables 32. Rotative movment of cables 32 causes frame members 26 to be drawn telescopically over frame members 18, with a resulting shortening of the wheel base of towing vehicle 10. To lengthen the wheel base of the towing vehicle 10, crank handle 40 is turned counterclockwise as viewed in FIG. 3 to extend frame members 18 and 26. A plurality of selectively spaced bolt openings 42 are formed in the side walls of frame members 18 and 26. As shown in FIGS. 3 and 5, selected bolt openings 42 in frame members 18 and 26 are aligned when the wheel and axle assemblies 12 and 14 are spaced a selected maximum distance apart, with the frame members being rigidly secured together against telescopic movement by bolts 44 inserted through the aligned openings 42 and anchored to the frame members by nuts 45. When the rear wheel and axle assembly 14 is retracted and drawn toward front wheel and axle assembly 12 to position the wheel assemblies a selected minimum distance apart, as seen in FIG. 6, other bolt openings 42 will become aligned in frame members 18 and 26 to allow for the insertion of bolts 44 therethrough to secure the frame members against telescopic movement.

Figure 2:
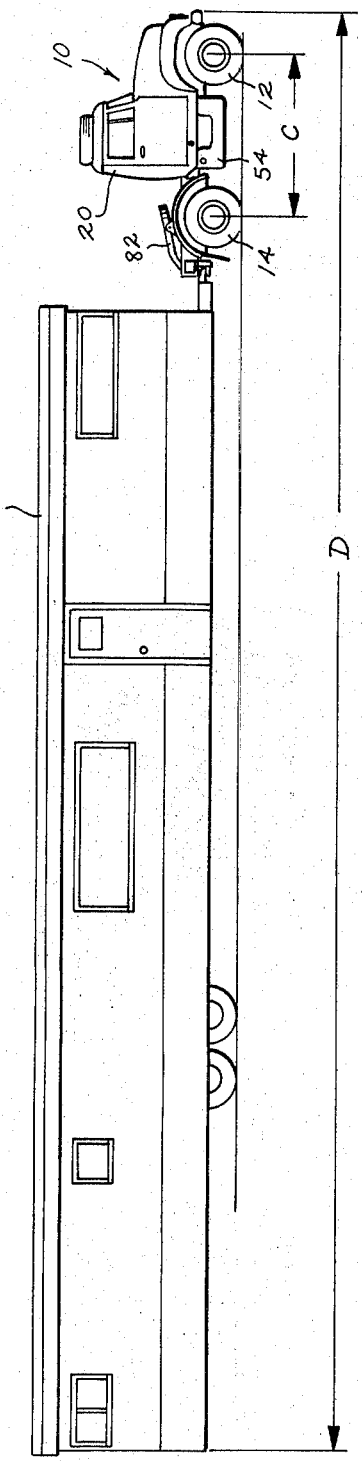
FIG. 2 is a view of the towing vehicle shown attached to the same mobile home seen in FIG. 1, but with the front and rear axle assemblies spaced a selected minimum distance apart.
Figure 3:
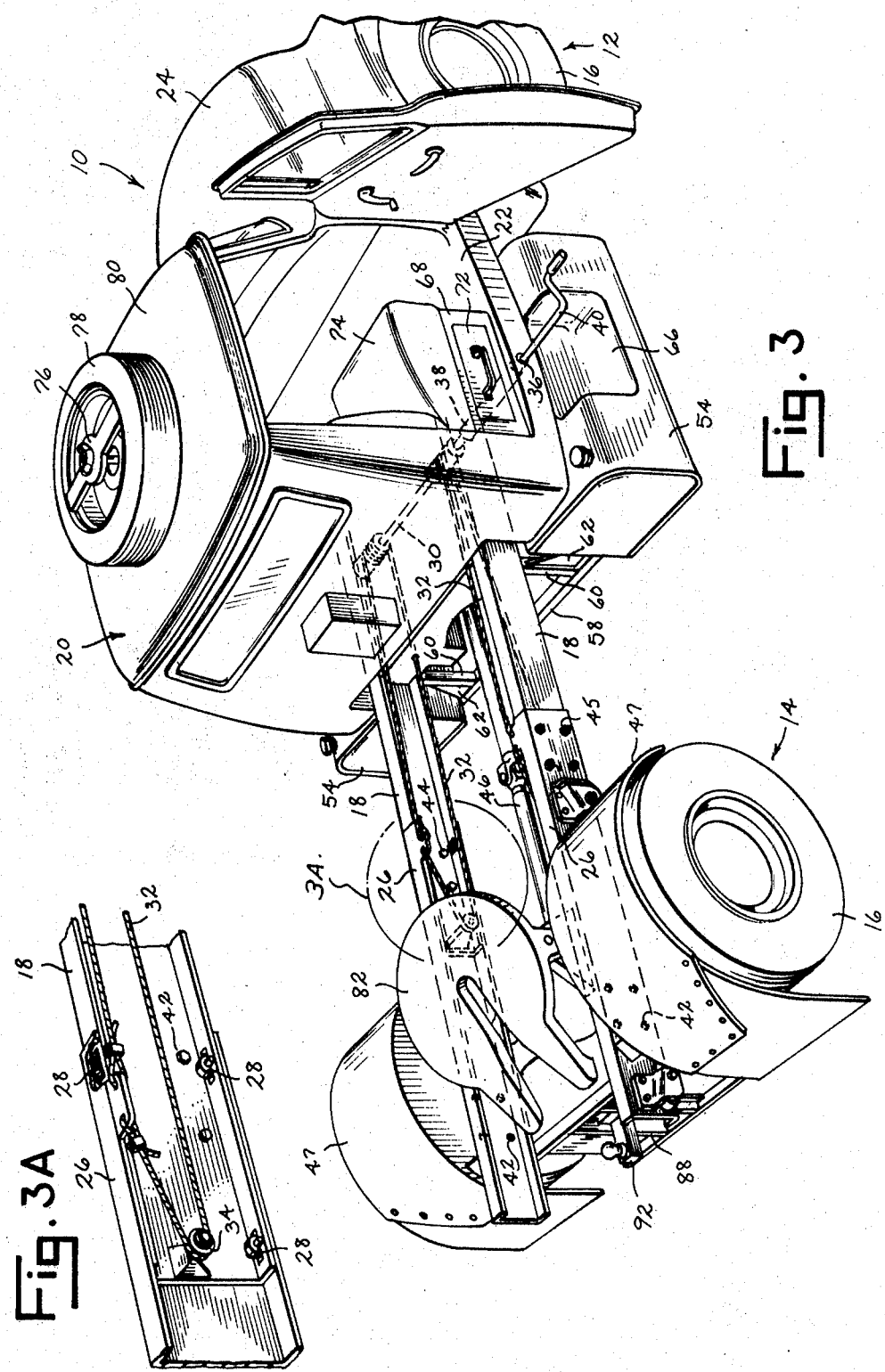
FIG. 3 is a fragmentary perspective view of the towing vehicle shown with its front and rear axle assemblies spaced a selected maximum distance apart.
Figure 4:
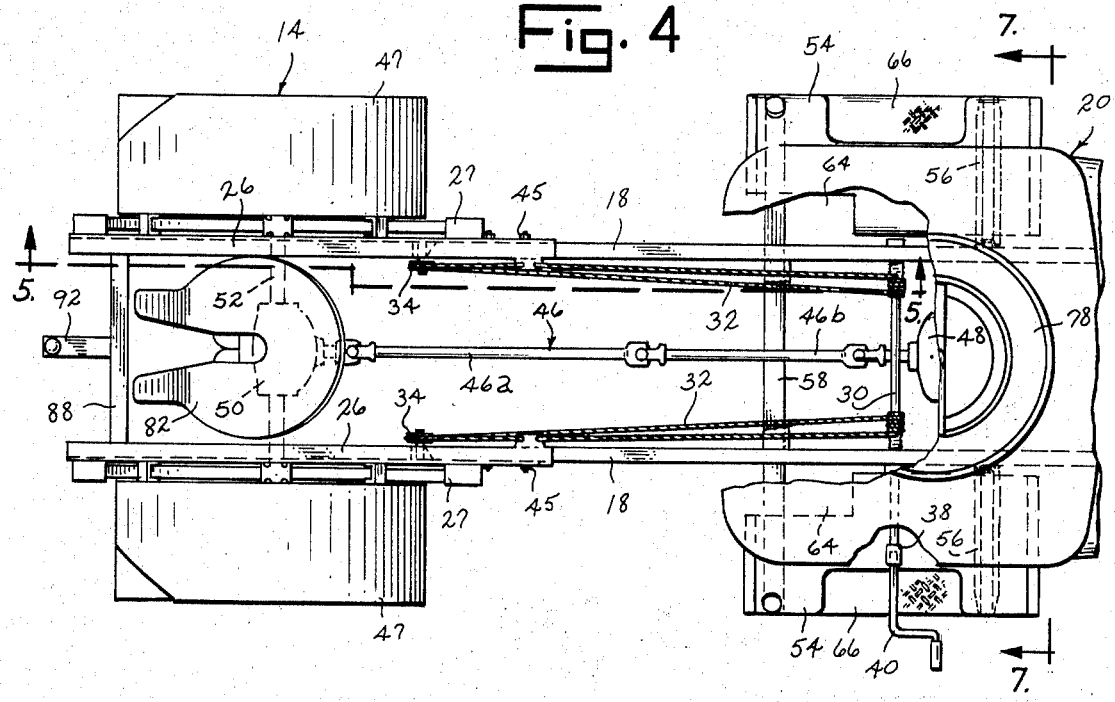
FIG. 4 is a fragmentary top plan view of the towing vehicle shown with the front and rear axle assemblies spaced a selected maximum distance apart.

The effect of lengthening and shortening the wheel base of towing vehicle 10 is best illustrated in FIGS. 1 and 2. In FIG. 1, wheel assemblies 12 and 14 are spaced a distance "A" apart, thus causing the mobile home and towing vehicle combination to have an over-all length "B". In FIG. 2, the spacing between the wheel and axle assemblies 12 and 14 is shortened to a distance "C" which is less than distance "A" in FIG. 1 and which causes the mobile home and towing vehicle combination to have an over-all length "D" which is shorter than over-all length "B".

Towing vehicle 10 is provided with a multiple-piece drive shaft 46 which extends between motor transmission 48 and differential 50. Differential 50 is connected to axle 52 of wheel and axle assembly 14. When the rear wheel and axle assembly is moved from its extended position shown in FIG. 5 to its retracted position shown in FIG. 6, one part 46a of drive shaft 46 is removed, with the remaining part 46b of the drive shaft being directly connected between transmission 48 and differential 50.

The fuel storage assembly for towing vehicle 10 includes two laterally spaced tanks 54 which are connected by suitable fuel conduits to the motor of the vehicle. Tanks 54 are positioned on opposite sides of and under housing 20. Tanks 54 are preferably located adjacently rearwardly of wheels 16 of front wheel and axle assembly 12 and are supported by means of a forward pair of angular frame supports 56 and a rear transverse horizontal frame support 58. Angular frame supports 56 are connected to frame members 18. Rear frame support 58 extends under tanks 54 and is connected to frame members 18 by vertical stanchions 60 and interconnecting gusset plates 62 (see FIG. 3). Frame supports 56 and 58 carry the weight of tanks 54 which are secured to the supports by welding or suitable straps (not shown). Tanks 54 are positioned under housing 20 so as to permit rear wheel and axle assembly 14 to be shifted as close to housing 20 as feasible. To prevent interfering contact between the forward ends of frame members 26, wheel suspensions 27, and tanks 54 when the rear wheel and axle assembly is shifted into its retracted position, it is preferable that each tank be formed with a cut-out portion 64 to receive the forward ends of a frame member 26 and suspension 27. Additionally, tanks 54 are located sufficiently forwardly under housing 20 so as not to contact fenders 47 of the rear wheel and axle assembly when the assembly is in its retracted position. Each tank 54 is preferably formed with a step 66 so as to facilitate entry and departure from driver's compartment 22 of housing 20.

A tool box 68 which will contain selected tools for repair purposes and for the purpose of removing and replacing bolts 44 and nuts 45 which connect frame members 18 and 26 is provided. Tool box 68 is preferably carried within driver's compartment 22 of housing 20 next to the driver's seat 70 therein. Tool box 68 includes a sliding door 72 and may have a seat 74 mounted thereon to accommodate an additional driver or a rider.

A spare tire mount 76 for one or more spare vehicle tires 78 is mounted to the top 80 of housing 20 over driver's compartment 22. Spare tire 78 may be for towing vehicle 10 or for the trailer or mobile home being towed by vehicle 10. A fifth wheel 82 is carried by frame members 26 above rear wheel and axle assembly 14. The utilization of the fifth wheel to carry a low-boy trailer 84 loaded with travel trailers 86 is shown in FIG. 10. A transverse hitch mounting plate 88 is connected to frame members 26 and positioned adjacently rearwardly of rear wheel and axle assembly 14. Hitch mounting plate 88 includes a connector part 90 to which a ball type hitch 92 (see FIG. 8) or a pintle type hitch 94 (see FIG. 9) may be releasably connected. Ball type hitch 92 can be utilized to tow a mobile home such as the mobile home 96 shown in FIGS. 1 and 2. The pintle hitch 94 can be utilized to tow a flat-deck type trailer 98 which can be loaded with boats 100 as shown in FIG. 11. Hitches 92 and 94 can be carried within tool box 68.

To enable towing vehicle 10 to accommodate semi-trailers, mobile homes, travel trailers, low-boy trailers, flat-bed trailers, and other types of trailers all of which have different and varying types of braking systems, the towing vehicle is provided with four types of braking systems, all actuated from the driver's compartment 22 of housing 20. Vacuum brakes, air brakes, hydraulic and electric brakes can be operated by foot control or hand control means in the driver's compartment 22.

It is to be understood that the above description of the versatile towing vehicle of this invention is not to be limited to the details above given, but may be modified within the scope of the appended claims.

What I claim is:

1. A towing vehicle comprising a front axle and wheel assembly and a rear axle and wheel assembly, housing means carried by said front axle and wheel assembly and including a driver's compartment, motor means within said housing means and connected to at least one of said axle and wheel assemblies for imparting motion to said vehicle, frame means connecting said wheel and axle assemblies, said frame means including longitudinally shiftable parts and being adjustable wherein said rear wheel and axle assembly is shiftable relative to said front wheel and axle assembly between a retracted position in which said assemblies are spaced a first distance apart and an extended position in which said assemblies are spaced a second distance apart which exceeds said first distance, said shiftable parts of the frame means including first and second pairs of telescopically interfitting longitudinal frame parts, said first pair of frame parts carrying said front wheel and axle assembly, said second pair of frame parts carrying said rear wheel and axle assembly and including end portions slidable over said first pair of frame parts and positioned forwardly of said rear wheel and axle assembly, means for securing said rear wheel and axle assembly in its extended and retracted positions, fuel tank means for said motor means carried under said housing means, said fuel tank means including spaced tank parts carried on opposite sides of said housing means, said tank parts having recessed portions adjacent said first pair of frame parts, said rear wheel and axle assembly being positioned adjacent said housing means when in said retracted position with said end portions of said second pair of frame parts fitting within said recessed tank part portions and between said tank parts.

2. The vehicle of claim 1 wherein said rear wheel and axle assembly includes suspension means, said suspension means fitting within said recessed tank part portions when said rear wheel and axle assembly is located in its retracted position.

* * * * *